United States Patent

[11] 3,584,603

| [72] | Inventor | Dwayne C. Rutherford |
| | | Vail, Iowa 51465 |
| [21] | Appl. No. | 857,897 |
| [22] | Filed | Sept. 15, 1969 |
| [45] | Patented | June 15, 1971 |

[54] FARROWING LAYOUT
9 Claims, 4 Drawing Figs.

[52] U.S. Cl. ............................................. 119/16, 119/28
[51] Int. Cl. ............................................. A01k 01/00
[50] Field of Search ................................. 119/16, 28, 20, 22, 15

[56] References Cited
UNITED STATES PATENTS

| 3,148,663 | 9/1964 | Conover | 119/16 |
| 3,213,828 | 10/1965 | Sorensen | 119/20 |
| 3,225,737 | 12/1965 | Biehl | 119/16 |
| 3,418,975 | 12/1968 | Smith | 119/20 |

*Primary Examiner*—Hugh R. Chamblee
*Attorney*—Henderson and Strom

ABSTRACT: A farrowing layout in a building having exterior sidewalls and a roof. The floor comprises two raised rectangular pads extending longitudinally of the building in side-by-side relation. The pads slope downwardly from intermediate the longitudinal sides of the pads to the longitudinal sides. Two longitudinal manure troughs are formed contiguous with the exterior longitudinal sides of the pads and slats are formed over the troughs. A central aisle is formed between the pads. A plurality of farrowing enclosures are juxtaposed in two longitudinal rows which are positioned over the pads, the pads thereby serving as a floor for the farrowing enclosures.

INVENTOR
DWAYNE C. RUTHERFORD
BY Henderson Strom
ATTORNEYS

PATENTED JUN 15 1971

INVENTOR
DWAYNE C. RUTHERFORD
BY
Henderson & Strom
ATTORNEYS

FARROWING LAYOUT

BACKGROUND OF THE INVENTION

This invention relates to farrowing layouts and is particularly concerned with farrowing layouts which remain dry and sanitary and protect the young piglets.

It has been customary to provide bred sows with a small farrowing house in an open field. The sows farrowed therein were free to roam around the field and mingle with other sows and their respective young piglets.

Recently, pork producers have found that sows could more efficiently and economically be farrowed inside a building constructed for that purpose. There is less incidence of disease among the sows and young piglets if the farrowing houses can be properly sanitized and fewer piglets are accidentally killed by the brood sows if the farrowing enclosures are properly engineered.

Several attempts have been made to provide farrowing layouts; some of which are particularly described in Conover, U.S. Pat. No. 3,148,663; McMurry et al., U.S. Pat. No. 3,042,000; Biehl, U.S. Pat. No. 3,225,737; Rigterink, U.S. Pat. No. 3,137,270 and Sievers, U.S. Pat. No. 3,097,625. However, problems are encountered with wet floors, disease, and accidental death of young piglets when using these farrowing layouts.

The farrowing layout of this invention alleviates these problems. The floors of the farrowing layout of this invention are designed to remain dry thus limiting the spread of disease. Additionally, the enclosures are engineered to prevent accidental death of young piglets.

SUMMARY OF THE INVENTION

This invention relates to a farrowing layout comprising a building with exterior walls and a roof. The floor is specially constructed and comprises two raised pads extending longitudinally of the building in side-by-side relation and spaced laterally from the sidewalls and each other. The pads slope downwardly from intermediate the longitudinal sides of the pads to the longitudinal sides. Two manure troughs are formed contiguous of the exterior, longitudinal sides of the pads and extend downwardly of the pads. The manure troughs are covered by slat means. A central aisle is formed between the pads to provide access thereto. A plurality of enclosures are juxtaposed in two longitudinal rows over the pads and the manure troughs contiguous therewith. Each enclosure comprises a central sow area and, on the longitudinal sides thereof, piglet creep areas.

The principle object of this invention is to provide a farrowing layout with a specially constructed floor which remains dry.

Another object of this invention is to provide a farrowing layout with an improved sanitation system.

Still another object is to provide a farrowing layout giving easy access to each individual enclosure.

Yet another object is to provide a farrowing layout which is economical, easily manufactured and readily assembled.

DESCRIPTION OF THE PREFERRED EMBODIMENTS

Figure 1:
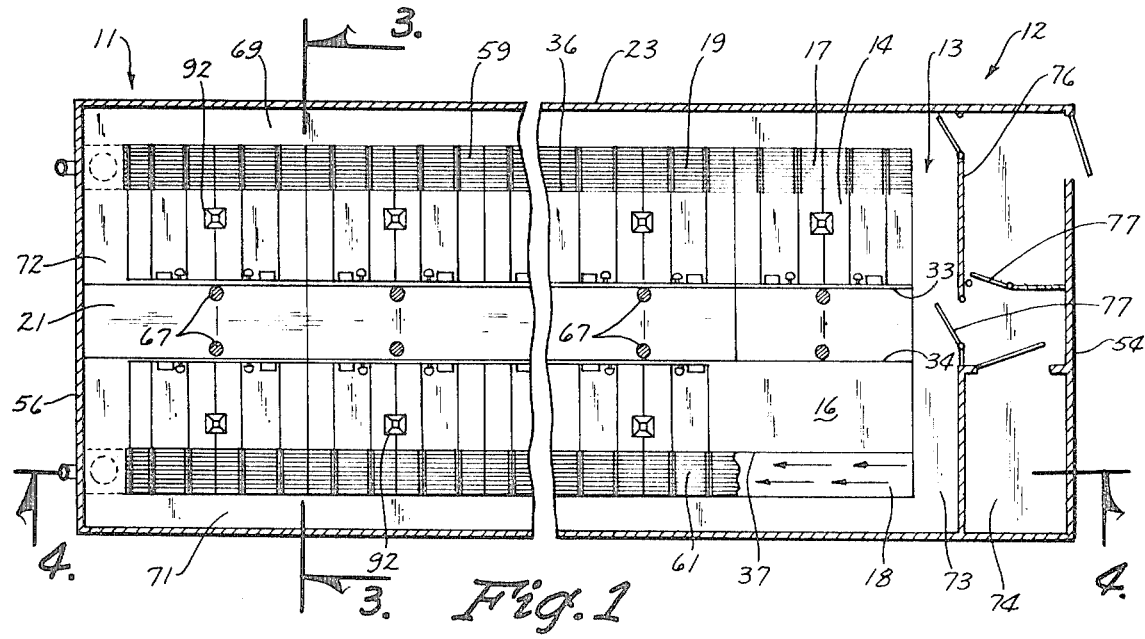
FIG. 1 is a broken, cross-sectional view from the top of the farrowing layout of this invention.
Figure 2:
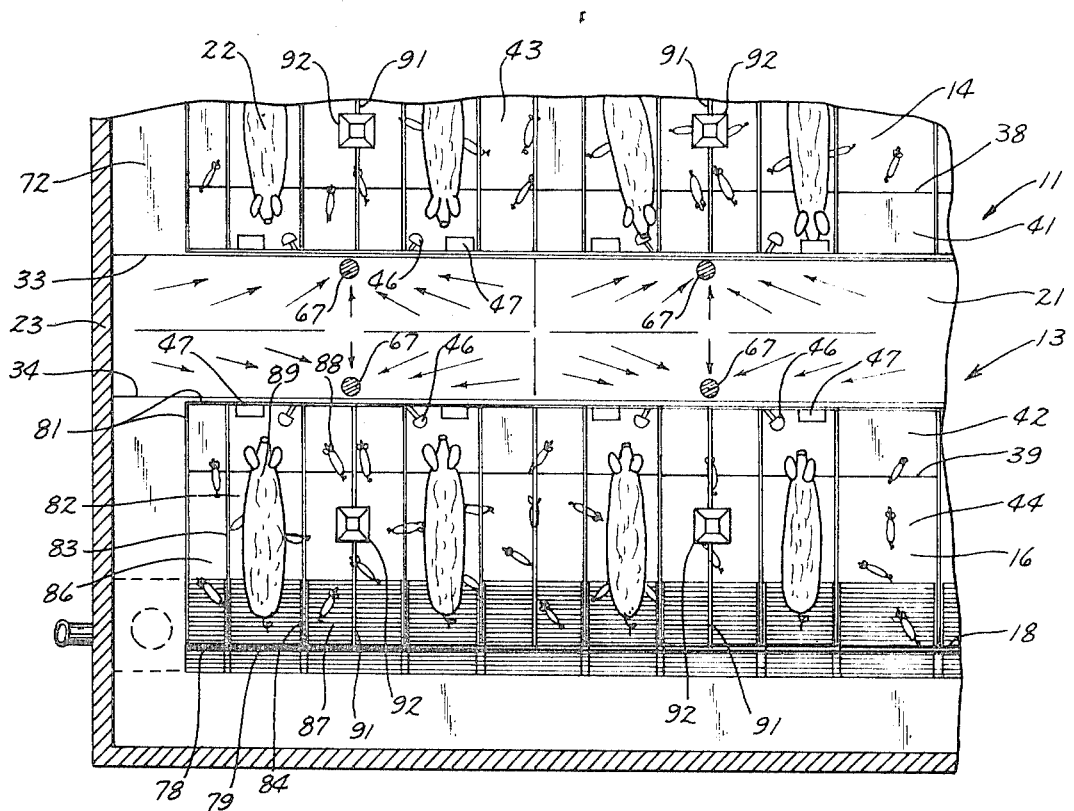
FIG. 2 is an enlarged broken, cross-sectional view of FIG. 1.
Figure 3:
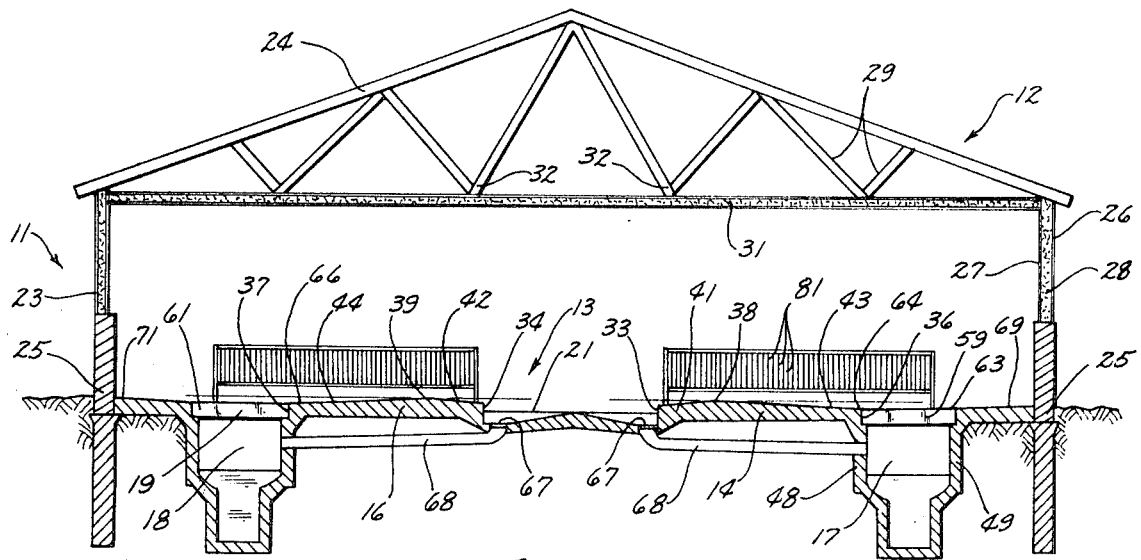
FIG. 3 is a cross-sectional view taken along line 3–3 of FIG. 1.

Referring now to the drawings, the farrowing layout of this invention is generally indicated at 11 in FIGS. 1–3. The farrowing layout 11 is comprised of a building 12 having a specially constructed floor 13. The floor 13 comprises two raised pads 14 and 16; each pad 14 and 16 having a manure trough 17 and 18 formed contiguously therewith. Means 19 are formed over the manure troughs 17 and 18 substantially level with the pads 14 and 16. An aisle 21 is formed between the pads 14 and 16. A plurality of enclosures 22 are juxtaposed in two longitudinal rows and positioned over the pads 14 and 16; the enclosures 22 being adapted to retain a sow and her piglets.

More specifically, the building 12 is of rectangular configuration and has exterior sidewalls 23 and a roof 24 (FIGS. 1—3). As shown in FIG. 3, the exterior sidewalls 23 are mounted on a poured concrete foundation 25. The sidewalls 23 consist of an outside panel 26 and an inside panel 27 with insulating material 28 therebetween. The roof 24 is supported by a plurality of truss members 29 and a false ceiling 31 is secured to the lower portion 32 of the truss members 29.

The floor 13 (FIGS. 1—3) is specially constructed, generally of poured concrete. The floor 13 comprises two raised pads 14 and 16 which extend longitudinally in the building 12 in side-by-side relation and which are spaced laterally from the exterior sidewalls 23. The pads 14 and 16 each have interior longitudinal sides 33 and 34 and exterior longitudinal sides 36 and 37. The pads 14 and 16 slope downwardly from a longitudinal line 38 and 39 intermediate the longitudinal sides 33, 34, 36 and 37 to the longitudinal sides 33, 34, 36 and 37. The pads 14 and 16 are generally and preferably of rectangular configuration.

In a preferred embodiment of this invention, the interior portions 41 and 42 of the pads 14 and 16 between the longitudinal lines 38 and 39 and the longitudinal interior sides 33 and 34 comprise from 20 percent to 35 percent of the lateral width of each pad 14 and 16. The interior portions 41 and 42 of the pads 14 and 16 drain into the central aisle 21 and are thereby maintained in a dry condition. The exterior portions 43 and 44, of course, comprise the remainder of the pads 14 and 16 and drain directly into the manure troughs 17 and 18.

The pads 14 and 16 are generally about 62 inches in width and are of sufficient length to accommodate the desired number of sows. The interior portions 41 and 42 are generally about 16 inches wide with the exterior portions 43 and 44 being about 46 inches wide. The slope of the interior portions 41 and 42 is about 1.2 inches per foot while the slope of the exterior portions 43 and 44 is about 0.4 inches per foot. The pads 14 and 16 are raised at least 1 inch above the central aisle 21.

As explained in detail hereinafter, waterers 46 and feeders 47 are disposed on the pads 14 and 16 proximate the interior longitudinal sides 33 and 34 of the pads 14 and 16. Any feed or water which falls to the pad 14 and 16 will drain into the central aisle 21. The sows are restrained and, therefore, they defecate and urinate over the manure troughs 17 and 18 keeping the exterior portions 43 and 44 of the pads 14 and 16 dry.

Figure 4:
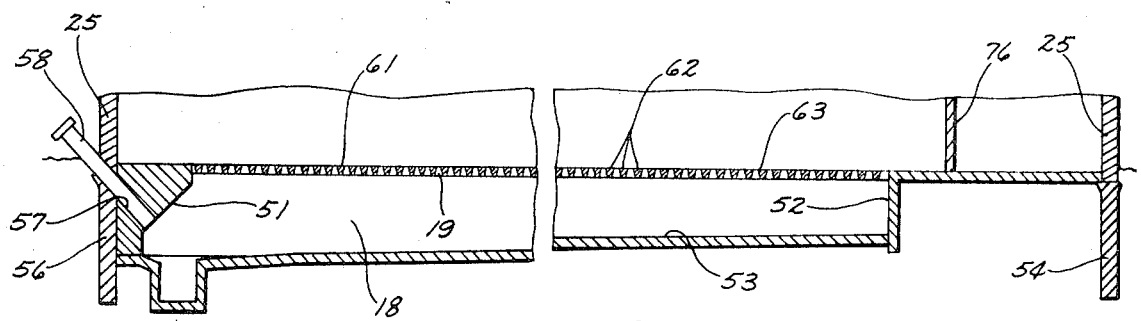
FIG. 4 is a broken, cross-sectional view taken along line 4–4 of FIG. 1.

The manure troughs 17 and 18 (FIGS. 3 and 4) are formed contiguous with the exterior longitudinal sides 33 and 34 of the pads 14 and 16 and extend downwardly thereof. The manure troughs 17 and 18 are formed proximate the exterior sidewalls 23. The manure troughs 17 and 18 have two longitudinal sidewalls 48 and 49 and two endwalls 51 and 52. The floors 53 of the troughs 17 and 18 slope downwardly from one end 54 of the building 12 to the other end 56. The troughs 17 and 18 are adapted to be filled with water which controls odor in the building and aids in cleaning the troughs 17 and 18.

The troughs 17 and 18 are provided at the low end 56 thereof with cleaning openings 57 and pipes 58. When the troughs 17 and 18 are cleaned, the hose of a suction pump (not shown) is inserted through the pipes 58 and the contents of the troughs 17 and 18 are removed.

The manure troughs 17 and 18 (FIGS. 1—4) are covered by removable grates 59 and 61 comprised of a plurality of wooden slats 62. The tops 63 of the slats 62 are in substantially the same horizontal plane, generally slightly lower, as the uppermost portions 64 and 66 of the longitudinal exterior sides 36 and 37 of the pads 14 and 16.

A central aisle 21 (FIGS. 1—3) is formed between the pads 14 and 16. The aisle 21 is of sufficient width to permit passage of hogs therethrough. The aisle 21 is utilized for inspection of the animals and for feeding the animals.

Drain means 67 (FIGS. 2 and 3) are formed in spaced relation along the junctures of the central aisle 21 and the interior longitudinal sides 33 and 34 of the pads 14 and 16. The drain means 67 are generally of circular configuration and communicate, through pipes 68 (FIG. 3), with the manure troughs 17 and 18. The pipes 68 are sloped downwardly toward the manure troughs 17 and 18 to prevent water from standing therein. The central aisle 21 slopes radially upwardly from each of the circular drain means 67. Therefore, water remains on the central aisle 21 for only very short periods of time.

As shown schematically in FIGS. 2 and 3, the drain means 67 are spaced 10 feet apart. At the drain 67, the drain 67 is preferably about 3⅝ inches below the upper surface of the pads 14 and 16. The aisle 21 slopes radially upwardly a vertical distance of about 2⅝ inches from each of the drain means 67.

Longitudinal aisles 69 and 71 (FIGS. 1 and 2) are also preferably formed between the exterior sidewalls 23 and the manure troughs 17 and 18 adjacent thereto. These longitudinal aisles 69 and 71 also slope downwardly from the exterior walls 23 to the manure troughs 17 and 18.

As shown in FIG. 1, aisles 72 and 73 are generally formed at the ends 54 and 56 of the building 12. At one end 54, a washing and unloading area 74 is usually formed. A fence 76, with gates 77 therein, encloses the washing and unloading area 74.

A plurality of enclosures 78 are juxtaposed in two longitudinal rows, one of said rows being positioned over each of said pads 14 and 16 and the manure trough 17 and 18 contiguous therewith. Each of the enclosures 78 is formed from metal fences 79, preferably utilizing all round members 81 to facilitate cleaning thereof. The lowest horizontal members 81 of the metal fences 79 are spaced above the pads 14 and 16 to facilitate cleaning thereof.

The metal fences 79 or walls, define a central sow area 82 and, on the two longitudinal sides 83 and 84 of the sow area 82, piglet creep areas 86 and 87. The fence 79 around the periphery of the enclosure 78 is disposed close enough to the pads 14 and 16 to prevent piglets from crawling thereunder. Conversely, the fences 79 separating the sow area 82 and the piglet creep areas 86 and 87 are purposely raised to allow the piglets 88 to roam through the entire enclosure 78 while restraining the sow 89 in the sow area 82. The sow area 82 and the piglet creep areas 86 and 87 each extend from an interior longitudinal side 33 and 34 to over the manure trough 17 and 18 contiguous therewith. The sow area 82 is of such width as to restrain the sow 89 from turning around therein.

A waterer 46 and a feeder 47 are positioned in each of the sow areas 82 proximate the interior longitudinal sides 33 and 34 of the pads 14 and 16. The sow thus faces inwardly and is supplied continuously with food and water. Feces and urine are deposited in the manure trough 17 and 18.

The drain means 67 are formed proximate one longitudinal side 91 of each of the enclosures 78, one drain means 67 serving two juxtaposed enclosures 78. The waterer 46 is preferably located in the sow enclosures 78 as close to the drain means 67 as possible. The water that is spilled then drains quickly from the aisle 21.

Brooder lights 92 are disposed over this same longitudinal side 91 of the enclosures 78. The brooder lights 92 are utilized to warm the young piglets 88. As no bedding is utilized herein, the brooder lights 92 also warm the concrete thereby facilitating movement of the piglet feces to the drain means 67. The brooder lights 92 also facilitate drying of the pad 14 and 16 and the aisle 21.

Although a preferred embodiment has been described, it is to be remembered that various modifications may be made without departing from the invention as defined in the appended claims.

I claim:
1. A livestock farrowing layout comprising
a building having exterior sidewalls and a roof;
a floor in said building comprising
two raised pads extending longitudinally of said building in side by side relation and being spaced laterally from said sidewalls and from each other, said pads having interior and exterior longitudinal sides and sloping downwardly from intermediate said longitudinal sides to said longitudinal sides; two longitudinal manure troughs formed contiguous of said exterior, longitudinal sides of said pads and extending downwardly of said pads; means forming grates over said troughs in substantially the same horizontal plane as the uppermost portion of said exterior sides of said pads; and a central aisle between said pads; and
a plurality of enclosures juxtaposed in two longitudinal rows, each of said rows extending over one of said pads, each of said enclosures consisting of a plurality of connecting walls defining a rectangular sow area and, on the two longitudinal sides of said sow area, piglet creep areas; each of said areas extending from the interior longitudinal side of said pad to over said trough contiguous with said pad.

2. The livestock farrowing layout of claim 1 wherein said building is of rectangular configuration and said pads are of rectangular configuration.

3. The livestock farrowing layout of claim 2 wherein the interior portions of said pads slope downwardly to said interior longitudinal sides, said interior portions comprising from about 20 percent to about 35 percent of said pads, and wherein
the exterior portions of said pads slope downwardly to said exterior longitudinal sides, said exterior portions comprising from about 80 percent to about 65 percent of said pads.

4. The livestock farrowing layout of claim 3 wherein drain means are formed, in spaced relation, along the junctures of said central aisle and the interior longitudinal sides of said pads, said drain means communicating with said manure troughs, said central aisle sloping radially upwardly from each of said drain means.

5. The livestock farrowing layout of claim 4 wherein a waterer and a feeder are disposed in each of said sow areas proximate said interior longitudinal sides of said pads.

6. The livestock farrowing layout of claim 5 wherein said manure troughs slope downwardly from one end to the other, and wherein
side aisles are formed between each of said exterior sidewalls and said manure trough adjacent thereto.

7. The livestock farrowing layout of claim 6 wherein said drain means are formed proximate one longitudinal side of each of said enclosures, one of said drain means serving two juxtaposed enclosures.

8. The livestock farrowing layout of claim 7 wherein said floor, with the exception of said means for forming grates over said troughs, is formed from poured concrete.

9. The livestock farrowing layout of claim 8 wherein brooder lights are disposed over one longitudinal side of each of said enclosures, one of said brooder lights serving two juxtaposed piglet creep areas and being disposed laterally of said drain means.